United States Patent [19]

Steiner et al.

[11] Patent Number: 4,997,599

[45] Date of Patent: Mar. 5, 1991

[54] PREPARATION OF WATER SOLUBLE CELLULOSE ACETATE MICROSPHERES

[75] Inventors: Thomas L. Steiner, Charlotte, N.C.; Dana T. Minnick, University Heights, Ohio; Kenneth A. Domeshek, Matthews; Donald H. Lester, Jr., Pineville, both of N.C.

[73] Assignee: Celanese Fibers Inc., New York City, N.Y.

[21] Appl. No.: 394,348

[22] Filed: Aug. 15, 1989

Related U.S. Application Data

[62] Division of Ser. No. 130,345, Dec. 8, 1987, Pat. No. 4,888,420.

[51] Int. Cl.$^5$ ............................. B29B 9/00; B29B 9/12
[52] U.S. Cl. ........................................ 264/5; 264/4.3; 264/4.6; 424/461; 424/488; 424/499; 428/402.2; 512/4; 514/963
[58] Field of Search ..................... 264/4.3, 4.6, 5; 428/402.2; 424/461, 488, 499; 514/963

[56] References Cited

U.S. PATENT DOCUMENTS

| | | | |
|---|---|---|---|
| 2,140,543 | 12/1938 | Northrop et al. | 260/102 |
| 3,067,463 | 12/1962 | Patton et al. | 425/10 |
| 3,242,051 | 3/1966 | Hiestand et al. | 264/4.32 X |
| 3,691,090 | 9/1972 | Kitajima et al. | 264/4.6 |
| 3,748,277 | 7/1973 | Wagner | 264/4.3 |
| 3,943,063 | 3/1976 | Morishita et al. | 264/4.6 |
| 4,024,334 | 5/1977 | Chandler et al. | 536/65 |
| 4,063,017 | 12/1977 | Tsao et al. | 536/57 |
| 4,090,022 | 5/1978 | Tsao et al. | 536/57 |
| 4,228,276 | 10/1980 | Kuo et al. | 536/76 |
| 4,312,980 | 1/1982 | Motozato et al. | 536/76 |
| 4,390,691 | 6/1983 | Nishikawa et al. | 536/65 |
| 4,420,442 | 12/1983 | Sands | 264/13 |
| 4,461,892 | 7/1984 | Nishikawa et al. | 536/65 |
| 4,551,389 | 11/1985 | Ohtake et al. | 428/402 |
| 4,663,447 | 5/1987 | Yamazaki et al. | 536/76 |
| 4,671,909 | 6/1987 | Torobin | 264/43 |
| 4,683,092 | 7/1987 | Tsang | 264/4.3 |
| 4,826,689 | 5/1989 | Violanto et al. | 514/965 X |

FOREIGN PATENT DOCUMENTS 0135022  7/1984  European Pat. Off. ............ 424/488

*Primary Examiner*—Richard D. Lovering
*Attorney, Agent, or Firm*—Robert H. Hammer, III

[57] ABSTRACT

Microparticle of cellulose acetate and derivatives thereof characterized by being water soluble, having a large interior void space and having a plurality of open exterior surface pores. These water soluble microparticles can be loaded with a chemical selected from the group consisting of pharmaceuticals, dyes, flavorings, agriculturals, solid catalysts and fragrances. The microparticles are produced by forming spherical droplets of a dope of water soluble cellulose acetate and water soluble derivatives of cellulose acetate with a solvent therefor, precipitating the spherical droplets in a bath of a precipitant for water soluble cellulose acetate and water soluble derivatives of cellulose acetate, separating the excess precipitant from the microparticles, enriching the microparticles with the precipitant by contacting the microparticles one or more times with a solution of the precipitant, removing rapidly under vacuum substantially all of the precipitant from the microparticles, and recovering the resulting water soluble microparticles.

2 Claims, 1 Drawing Sheet

PREPARATION OF WATER SOLUBLE CELLULOSE ACETATE MICROSPHERES

This is a divisional of copending application Ser. No. 07/130,345 filed on Dec. 8, 1987, now U.S. Pat. No. 4,888,420.

FIELD AND BACKGROUND OF THE INVENTION

The present invention relates to the formation of microparticles of water soluble cellulose acetate and water soluble derivatives of cellulose acetate.

Microparticles of cellulose organic esters generally and microparticles of cellulose acetate particularly are known in the art. Such particles are used for immobilization of enzymes, filter packings, chromatographic packings and the controlled release of chemicals. Various methods of forming cellulose organic ester particles are known in the art. For example, U.S. Pat. Nos. 4,390,691 and 4,461,892 to Nishikawa et al disclose processes for preparing porous spherical cellulose particles which include suspending a cellulose ester solution dissolved in a chlorinated hydrocarbon solvent into an aqueous solution, evaporating the solvent to form spherical particles and saponifying the spherical particles. However, these microparticles are not soluble in water thus the uses thereof are somewhat restricted especially with respect to the controlled release of chemicals and as catalyst carriers.

Water soluble cellulose acetate films and fibers and processes for producing them are known in the art. U.S. Pat. No. 2,129,052 to Fordyce, U.S. Pat. No. 2,448,082 to Creamer, U.S. Pat. No. 3,482,011 to Bohrer and U.K. Patent No. 696,903 to Davoud all disclose that water soluble and water susceptible cellulose acetate film and fibers can be produced by utilizing various esterification and/or hydrolysis techniques on cellulose acetate which is normally insoluble in water. Additionally, Russian Patent No. 1740744 discloses using water soluble cellulose acetate as a tablet binder for use by the pharmaceutical industry. However, there is no disclosure of the formation of water soluble cellulose acetate microspheres.

SUMMARY OF THE INVENTION

The present invention provides a process for producing microparticles of cellulose acetate and derivatives thereof which are soluble in water. Such water soluble microparticles have a higher porosity and improved permeability properties. Moreover because of the ease that the microparticles dissolve in water, they have a number of useful applications, as will be described more fully herein.

It has been found in accordance with the present invention that water soluble microparticles having a large interior void space and a plurality of open exterior surface pores can be produced by forming a stream of droplets of a dope of water soluble cellulose acetate by means of spraying the dope through a nozzle, and then precipitating the stream of droplets in a precipitant for water soluble cellulose acetate. The precipitated microparticles are enriched with the precipitant by contacting the microparticles with a solution of the precipitant one or more times, and then rapidly evaporating substantially all of the precipitant out of the microparticle. The resulting water soluble microparticles have many applications especially for the controlled release of chemicals and as carriers for chemicals, especially flavorants, fragrances and catalysts.

DETAILED DESCRIPTION OF THE INVENTION

Figure 1:
FIG. 1 is a scanning electronmicrograph of the interior structure of a water soluble cellulose acetate microparticle.

The term microparticle is synonymous with "microsphere" and is understood by persons skilled in the art as referring to particles having a particle size ranging from less than one micron to a maximum of about 1000 microns. Cellulose acetate is obtained by esterifying cotton linters or wood pulp. Water soluble microparticles of cellulose acetate and derivatives thereof have utility as a carrier and for controlled release of chemicals such as pharmaceuticals, dyes, flavorings, agriculturals and fragrances. The effectiveness of these microparticles is particularly improved by the interior and exterior structure of the microparticles of the present invention.

The term water soluble cellulose acetate is understood by persons skilled in the art as referring to cellulose acetate which dissolves in water relatively quickly and without leaving substantial amounts of insoluble residues. Typically, water soluble cellulose acetate has a degree of substitution ranging from about 0.5 to 1.0 with 0.7 to 0.9 being preferred. It is to be recognized that "degree of substitution" is just one of several conventional ways that is used to describe the type of cellulose acetate which is water soluble. Other common ways to describe it include measuring the acetyl value, measured as weight percent acetyl or weight percent acetic acid. The particular manner used to describe the cellulose acetate of the present invention is not critical, and whether a particular kind of cellulose acetate is water soluble will be readily apparent to those in this art.

With respect to water soluble derivatives of cellulose acetate, cellulose acetate phthalate and cellulose acetate succinate are exemplary of water soluble derivatives. These derivatives are the reaction product of phthalic anhydride or succinic anhydride and cellulose acetate. Unlike water soluble cellulose acetate, these derivatives are pH sensitive and when dissolving in water, the water must be maintained as a mildly acidic to basic medium, namely having a pH of from about 6.0 to 9.0.

The water soluble cellulose acetate microparticles of the present invention are prepared according to the so-called aerosol/precipitant quenching process. This process generally includes forming a stream of droplets from a dope solution by means of spraying or dripping the dope solution through a nozzle. For example, a dry inert gas, such as nitrogen, can be injected into the nozzle to assist in forming fine liquid droplets. Alternately, the nozzle may be perturbed at ultrasonic frequencies so as to assist in droplet formation. Other techniques for forming a stream of finely divided liquid droplets are also well known to those skilled in the art and may be employed in the practice of this invention. The particular technique employed in the practice of the present invention to form a stream of fine liquid droplets is not critical and thus various alternatives to those described above may be utilized and will be readily apparent to those in this art.

Where an aerosol spray type device is used, a nozzle diameter of from about 0.016 to 0.1 inches is employed. Preferred aerosol spray devices include a centrally positioned nozzle, such as the air sprayers marketed by Spraying Systems Company, Bellwood, Ill. Typical airless sprayers useful herein include conventional airless paint sprayers such as those marketed by the Warner Company, Minneapolis, Minn.

The dope solution is prepared by dissolving the water soluble cellulose acetate in a pure solvent for the cellulose acetate. Water is the preferred solvent and other pure solvents include formamide, dimethyl formamide, dimethyl acetamide, dimethyl sulfoxide, pyridine and N-methyl-2-pyrrolidone. Additionally, a pure solvent-/co-solvent solution may be used. Suitable co-solvents include alcohols such as methanol, ethanol and propanol, esters such as ethyl acetate, ethyl lactate and methyl acetate, ketones such as acetone and methylethyl ketone, ethylene glycol, glycerine, diethylamine, triethanolamine, acetic acid, 2-methoxyethanol and tetrahydrofuran. Specific suitable water/co-solvent solutions are described in "Far-Hydrolyzed Cellulose Acetate", Industrial and Engineering Chemistry, Volume 49, pages 79-83, herein incorporated by reference. The pure solvents and co-solvents may be mixed together with the provisos that the co-solvent is miscible in the pure solvent and that the proportion of the amount of pure solvent to co-solvent is adjusted to maintain the dope at a viscosity level capable of being formed into droplets.

Following formation, the droplets are dropped into a precipitant bath under conditions such that the liquid droplets are maintained as substantially spherical porous microparticles and the interior and exterior pores are formed. It is recognized that a precipitant for water soluble cellulose acetate is a pure liquid or mixture such that the cellulose acetate will not dissolve into the precipitant and form a homogeneous solution. Suitable precipitants also must be miscible with materials in the solvent mixture. The preferred precipitant for water soluble cellulose acetate is typically a liquid which is highly volatile at room temperature, such as methanol or acetone. Exemplary other precipitants include low molecular weight ketones, alcohols and esters such as ethanol, propanol, ethyl acetate, methyl acetate, methylethyl ketone, dioxane and 2-methoxyethanol.

The precipitation bath is disposed at a distance sufficient to allow formation of spherical droplets which result from the surface tension properties counteracting the viscosity properties of the droplets. For example, if water soluble cellulose acetate having a degree of substitution of about 0.9 is formed into a droplet at ambient temperature, the bath is disposed at a distance of at least about 60 inches, and preferably 55-75 inches below the nozzle. Otherwise, a drop of less than about 40 inches results in undesired oblong or teardrop shaped microparticles.

To recover the microparticles without agglomeration and collapse, the microparticles are first separated from the excess precipitant by filtration and then the microparticles are enriched by contacting the precipitant-enriched microparticle one or more times with a separate solution of the precipitant. This solution can be the same as the original precipitant solution or a new, different enriching precipitant can be employed with the proviso that the enriching precipitant is miscible with the original precipitant and the solvent for water soluble cellulose acetate. For example, methanol can be utilized to precipitate the microparticles, and then they can be contacted with acetone thereby exchanging acetone for methanol to enrich the microparticles with acetone. The enrichment step is done to lower the residual solvent level in the microparticle to a level low enough such that the microparticle will not redissolve when all the precipitant is removed. In either situation the free enriching precipitant is removed by a second filtration and residual precipitant is removed under vacuum. It is preferred that the residual precipitant be removed rapidly, thus a volatile precipitant and a high vacuum of about 700 to 750 mmHg are preferred.

Additionally, prior to placing the microparticle under a vacuum, the additional step of freeze drying the microparticle can be done to avoid having the microparticles redissolve on removal of all the precipitant. Freeze drying the microparticle freezes the water in the microparticle and the water sublimes under vacuum In either case, the microparticles are collected and are ready for a variety of end uses. For example, any common food or fragrance oil can be added to the water soluble cellulose acetate and the added compound later released in a controlled or sustained manner into a system by contacting the microparticles with water. Suitable food and fragrances oils include orange oil, citral, coffee, tea, lemon oil, synthetic lemon-lime flavor, strawberry flavor, vanilla, biacetyl, anise, lilac fragrance, pine fragrance, peppermint oil, oil of orchids essence, anethole, ethyl propionate, ethyl acetate, acetaldehyde, menthol and spearmint. Various other compounds can be released into a system in a similar manner, such as fungicides, pesticides, enzymes such as leucylpeptidase, aminopolypeptidase, $\beta$-amylase, carboxypeptidase, pepsin, trypsin, luciferase, d-amino acid oxidase, phosphorylase, papain, catalase, ascorbic acid oxidase, malt distase, rennin, pancreatin, $\alpha$-amylase, pectinase, lipase, phosphatase, pectase, urease, arginase and glyoxalase, drugs such as aspirin, amobarbitol sodium, prednisone and penicillin, dyes such as nitroarylamine, azo and anthraquinone water insoluble dyes and solid catalysts.

Figure 2:
FIG. 2 is a scanning electronmicrograph of the exterior surface of a water soluble cellulose acetate microparticle.

The release of these compounds is facilitated by the interior and exterior structure of the microparticles produced by the method of the present invention. As shown in FIG. 1, the interior structure of the microparticle includes a large interior void space or hole surrounded by a plurality of significantly smaller voids or pores which give the interior a spongy structure. As illustrated in FIG. 2, the exterior surface is characterized by having a plurality of open surface pores covering the entire exterior surface. The interior void space has a diameter greater than about 50 percent of the diameter of the microparticle, and the surface pores range in size from 0.1 to about 0.3 microns. It is believed that such an interior and exterior structure permits the water soluble microparticle to be loaded much easier and to allow for better control of the release of the loaded compound after the addition of water.

The invention is additionally illustrated in connection with the following examples, which are to be considered as illustrative of the present invention. It should be understood, however, that the invention is not limited to the specific details of the examples.

EXAMPLE 1

A dope solution consisting of 10% by weight cellulose acetate having a degree of substitution of 0.9 and the remainder water was metered by a gear pump through an aerosol nozzle of 0.02 inches inside diameter. Nitrogen at 4 psig was concurrently fed into the nozzle to cause the exiting dope stream to break up into discrete droplets. The nozzle was positioned at a height of about 60 inches above the precipitating bath. The entire bath was enclosed in a cabinet having suitable ventilation to permit removal of volatilized solvent and precipitant.

The precipitating bath was a 100% methanol bath agitated by means of air sparging. The precipitated microparticles and methanol were separated by filtration. A non-solvent exchange was done by contacting the methanol enriched microparticles with several solutions of methanol and acetone until only 100% acetone was used. The free acetone was removed by filtration followed by rapidly removing all the residual acetone under a vacuum of about 700 to 750 mmHg. As shown in FIGS. 1 and 2, this resulted in a microparticle having a large interior void space preferably with a diameter greater than about 50 percent of the diameter of the microparticle and having a plurality of open surface pores, preferably ranging in size from about 0.1 to about 0.3 microns. This structure greatly facilitates the ability to load the microparticle with the various chemical additives and compounds mentioned above. This microparticle has a bulk density of 0.197 g/ml and a surface area of 18 $m^2/g$.

EXAMPLE 2

Following procedures similar to that of Example 1, an attempt was made to produce a usable sample without the use of vacuum to remove the excess precipitant. The microparticles were permitted to precipitate and separated from the methanol by filtration. The microparticles were then dried, and as they dried, the microparticles were observed to irreversibly agglomerate and to form an unusable mass. This demonstrates that using a vacuum to remove any residual water and precipitant is necessary to avoid agglomeration and to form microparticles having the desired interior and exterior structure.

EXAMPLE 3

Following procedures similar to that of Example 1, a sample was prepared for study of the soak loading characteristic of a fragrance oil into the water soluble cellulose acetate microparticles. Particularly a 0.25g sample of the cellulose acetate microparticles was placed in a small 20 ml vial to which a citrus fragrance oil was added dropwise. The microparticles were stirred with a spatula to uniformly incorporate as much of the citrus oil as possible into the microparticles. The results and observations with respect to the addition of citrus oil are summarized in Table I.

TABLE I

| Addition No. | Mass of Citrus Oil Added (g) | Total Weight | Observations |
|---|---|---|---|
| 1 | 0.098 | 28.2 | Dry free flowing powder, pale yellow |
| 2 | 0.155 | 38.3 | Dry free flowing powder, light yellow |
| 3 | 0.216 | 46.4 | Dry free flowing powder, yellow |
| 4 | 0.275 | 52.4 | Dry slightly sticky powder |

A cross-section of the loaded microparticles was viewed under a microscope which showed the citrus oil had penetrated about 5% of the sphere diameter. Also 0.1g of the citrus oil-loaded microparticle was added to 200 ml of water at 22° C. and stirred Most of the microparticles dissolved with a slight foaming.

As is readily apparent a water soluble cellulose acetate microparticle produced according to Examples 1 and 3 results in a product which can easily be loaded with a variety of additives, and which can easily be caused to release the additives upon controlled addition of water.

The principles, preferred embodiments and modes of operation of the present invention have been described in the foregoing specification. The invention which is intended to be protected herein, however, is not to be construed as limited to the particular forms disclosed since those are to be regarded as illustrative rather than restrictive. Variations and changes may be made by those skilled in the art without departing from the spirit of the invention.

What is claimed is:

1. A process for the preparation of water soluble cellulose acetate microparticles comprising the steps of:

(a) forming spherical droplets of a dope of water soluble cellulose acetate with water where the cellulose acetate has a degree of substitution ranging from about 0.5 to about 1.0;

(b) precipitating the spherical droplets in a methanol bath;

(c) separating the excess methanol from the microparticles;

(d) contacting the resulting methanol enriched microparticles with acetone to exchange acetone for methanol to form an acetone enriched microparticle;

(e) removing free acetone by filtration;

(f) subjecting the microparticles to vacuum to substantially evaporate the residual acetone; and (g) recovering the resulting water soluble cellulose acetate microparticles.

2. A process according to claim 1 wherein said step of removing excess acetone by filtration includes freeze drying the microparticles to facilitate the removal of any free water therefrom.

* * * * *